United States Patent
Gupta et al.

(10) Patent No.: US 12,507,146 B2
(45) Date of Patent: Dec. 23, 2025

(54) USER EQUIPMENT (UE) POLICY ENHANCMENT FOR UE ROUTE SELECTION POLICY (URSP) IN EVOLVED PACKET SYSTEM (EPS)

(71) Applicant: Apple Inc., Cupertino, CA (US)

(72) Inventors: Vivek G Gupta, San Jose, CA (US); Krisztian Kiss, Rancho Santa Fe, CA (US); Sridhar Prakasam, Fremont, CA (US); Sudeep Manithara Vamanan, Uttenreuth (DE)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 18/176,822

(22) Filed: Mar. 1, 2023

(65) Prior Publication Data

US 2024/0073772 A1    Feb. 29, 2024

Related U.S. Application Data

(60) Provisional application No. 63/325,028, filed on Mar. 29, 2022.

(51) Int. Cl.
*H04W 4/00* (2018.01)
*H04W 40/02* (2009.01)
(Continued)

(52) U.S. Cl.
CPC .......... *H04W 40/02* (2013.01); *H04W 48/18* (2013.01); *H04W 76/12* (2018.02)

(58) Field of Classification Search
CPC ...... H04W 40/02; H04W 76/12; H04W 48/18
See application file for complete search history.

(56) References Cited

U.S. PATENT DOCUMENTS

| 12,114,222 B2* | 10/2024 | Roeland | H04W 36/00837 |
| 2016/0007390 A1* | 1/2016 | Starsinic | H04W 4/02 370/328 |

(Continued)

FOREIGN PATENT DOCUMENTS

| EP | 3820176 A1 | 12/2021 |
| WO | 2021/243598 A1 | 12/2021 |

OTHER PUBLICATIONS

European Search Report dated Jul. 27, 2023 in connection with Application Serial No. 23160927.

(Continued)

*Primary Examiner* — Abdelnabi O Musa
(74) *Attorney, Agent, or Firm* — Eschweiler & Potashnik, LLC; Matthew Glause

(57) ABSTRACT

A service device (e.g., a user equipment (UE), a new radio NB (gNB), mobility management entity (MME), or other network component or network management component) as a service provider or a service consumer can process or generate a downlink (DL) generic non-access stratum (NAS) transport (DL GENERIC NAS TRANSPORT) message that includes a UE policy container with UE route selection policy (URSP) rules associated with a 5G network in response to providing UE capability information for provisioning URSP rules in EPS. Parameters from the URSP rules associated with a 5G network can be derived to establish a packet data network (PDN) connection in an evolved packet system (EPS) of a 4G network.

20 Claims, 12 Drawing Sheets

(51) Int. Cl.
*H04W 48/18* (2009.01)
*H04W 76/12* (2018.01)

(56) References Cited

U.S. PATENT DOCUMENTS

| | | | |
|---|---|---|---|
| 2019/0037441 A1* | 1/2019 | Liu | H04W 60/00 |
| 2019/0053034 A1* | 2/2019 | Kim | H04W 76/11 |
| 2019/0116520 A1* | 4/2019 | Chaponniere | H04W 28/0268 |
| 2020/0040410 A1 | 2/2020 | Ernst et al. | |
| 2025/0063336 A1* | 2/2025 | Tiwari | H04W 8/18 |

OTHER PUBLICATIONS

3rd Generation Partnership Project; Technical Specification Group Services and System Aspects; System architecture for the 5G System (5GS); Stage 2; (Release 17); 3GPP TS 23.501 V17.4.0 (Mar. 2022); http://www.3gpp.org.

Study on Enhancement of 5G UE Policy; FS_eUEPO; 940072; New SID: Study on enhancement of 5G UE Policy; 9.1.3; TSG SA Rel-18 Prioritization Workshop; SP-211649; Dec. 9-10, 2021, Electronic meeting.

3rd Generation Partnership Project; Technical Specification Group Core Network and Terminals; User Equipment (UE) policies for 5G System (5GS); Stage 3; (Release 17); 3GPP TS 24.526 V17.6.0 (Mar. 2022); http://www.3gpp.org.

3rd Generation Partnership Project; Technical Specification Group Services and System Aspects; Policy and charging control framework for the 5G System (5GS); Stage 2; (Release 16); 3GPP TS 23.503 V16.11.0 (Dec. 2021); http://www.3gpp.org.

3rd Generation Partnership Project; Technical Specification Group Core Network and Terminals; Non-Access-Stratum (NAS) protocol for 5G System (5GS); Stage 3; (Release 17); 3GPP TS 24.501 V17.6.1 (Mar. 2022); http://www.3gpp.org.

3rd Generation Partnership Project; Technical Specification Group Services and System Aspects; Procedures for the 5G System (5GS); Stage 2; (Release 17); 3GPP TS 23.502 V17.4.0 (Mar. 2022); http://www.3gpp.org.

3rd Generation Partnership Project; Technical Specification Group Services and System Aspects; 5G System Enhancements for Edge Computing; Stage 2; (Release 17); 3GPP TS 23.548 V17.2.0 (Mar. 2022); http://www.3gpp.org.

* cited by examiner

800

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3-4 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| 65 | DCN-ID | DCN-ID 9.9.3.48 | O | TLV | 4 |
| E- | SMS services status | SMS services status 9.9.3.4B | O | TV | 1 |
| D- | Non-3GPP NW provided policies | Non-3GPP NW provided policies 9.9.3.49 | O | TV | 1 |
| 6B | T3448 value | GPRS timer 2 9.9.3.16A | O | TLV | 3 |
| C- | Network policy | Network policy 9.9.3.52 | O | TV | 1 |
| 6C | T3447 value | GPRS timer 3 9.9.3.16B | O | TLV | 3 |
| 7A | Extended emergency number list | Extended emergency number list 9.9.3.37A | O | TLV-E | 7-65538 |
| 7C | Ciphering key data | Ciphering key data 9.9.3.56 | O | TLV-E | 35-2291 |
| 66 | UE radio capability ID | UE radio capability ID 9.9.3.60 | O | TLV | 3-n |
| B- | UE radio capability ID deletion indication | UE radio capability ID deletion indication 9.9.3.61 | O | TV | 1 |
| 35 | Negotiated WUS assistance information | WUS assistance information 9.9.3.62 | O | TLV | 3-n |
| 36 | Negotiated DRX parameter in NB-S1 mode | NB-S1 DRX parameter 9.9.3.63 | O | TLV | 3 |
| 38 | Negotiated IMSI offset | IMSI offset 9.9.3.64 | O | TLV | 4 |
| | Payload container type | Payload container type 9.11.3.40 | O | TV | 2 |
| | Payload container | Payload container 9.11.3.39 | O | LV-E | 3-65537 |

802 → EPS network feature support
804 → Payload container
806 → Payload container type

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Tracking area update accept message identity | Message type 9.8 | M | V | 1 |
| | EPS update result | EPS update result 9.9.3.13 | M | V | 1/2 |
| | Spare half octet | Spare half octet 9.9.2.9 | M | V | 1/2 |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3-4 |
| F- | Additional update result | Additional update result 9.9.3.9A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| 68 | Header compression configuration status | Header compression configuration status 9.9.4.27 | O | TLV | 4 |
| 65 | DCN-ID | DCN-ID 9.9.3.48 | O | TLV | 4 |
| E- | SMS services status | SMS services status 9.9.3.4B | O | TV | 1 |
| D- | Non-3GPP NW policies | Non-3GPP NW provided policies 9.9.3.49 | O | TV | 1 |
| 8B | T3448 value | GPRS timer 2 9.9.3.16A | O | TLV | 3 |
| C- | Network policy | Network policy 9.9.3.52 | O | TV | 1 |
| 6C | T3447 value | GPRS timer 3 9.9.3.16B | O | TLV | 3 |
| 7A | Extended emergency number list | Extended emergency number list 9.9.3.37A | O | TLV-E | 7-65538 |
| 7C | Ciphering key data | Ciphering key data 9.9.3.56 | O | TLV-E | 35-2291 |
| 66 | UE radio capability ID | UE radio capability ID 9.9.3.60 | O | TLV | 3-n |
| B- | UE radio capability ID deletion indication | UE radio capability ID deletion indication 9.9.3.61 | O | TV | 1 |
| 35 | Negotiated WUS assistance information | WUS assistance information 9.9.3.62 | O | TLV | 3-n |
| 36 | Negotiated DRX parameter in NB-S1 mode | NB-S1 DRX parameter 9.9.3.63 | O | TLV | 3 |
| 38 | Negotiated IMSI offset | IMSI offset 9.9.3.84 | O | TLV | 4 |
| 37 | EPS additional request result | EPS additional request result 9.9.3.67 | O | TLV | 3 |
| | Payload container type | Payload container type 9.11.3.40 | M/O | TV | 2 |
| | Payload container | Payload container 9.11.3.39 | M/O | LV-E | 3-65537 |

902 → EPS network feature support
904, 906 → Payload container type / Payload container

FIG. 9

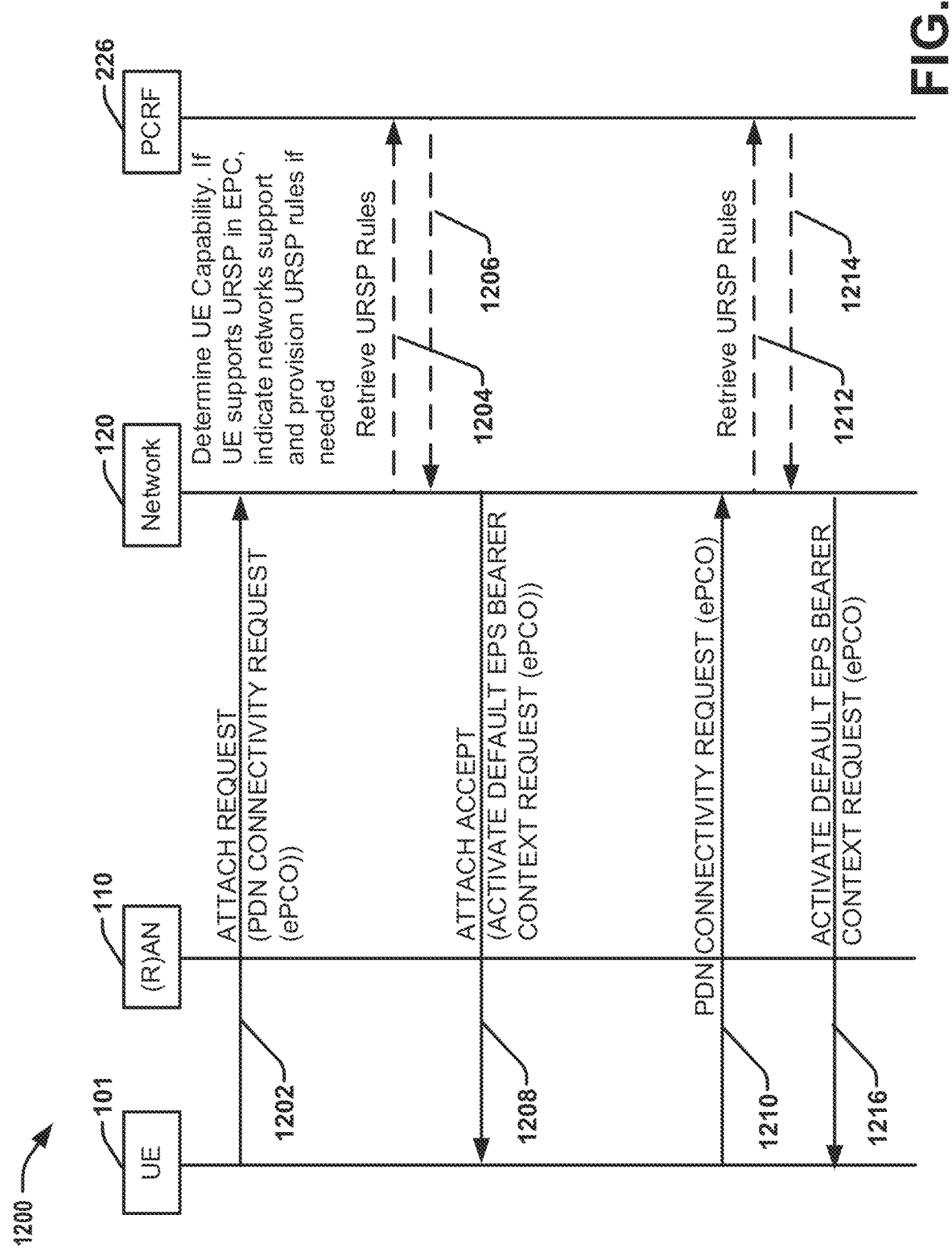

USER EQUIPMENT (UE) POLICY ENHANCMENT FOR UE ROUTE SELECTION POLICY (URSP) IN EVOLVED PACKET SYSTEM (EPS)

CROSS-REFERENCE TO RELATED APPLICATIONS

The application claims the benefit of U.S. Provisional Patent Application 63/325,028 filed Mar. 29, 2022, entitled "USER EQUIPMENT (UE) POLICY ENHANCEMENT FOR UE ROUTE SELECTION POLICY (URSP) IN EVOLVED PACKET SYSTEM (EPS)", the contents of which are herein incorporated by reference in their entirety.

FIELD

The present disclosure relates to wireless technology and more specifically to enhancing user equipment (UE) policy route selection policy (URSP) in an evolved packet system (EPS).

BACKGROUND

Mobile communication in the next generation wireless communication system, 5G, or new radio (NR) network is going to provide ubiquitous connectivity and access to information, as well as ability to share data, around the globe. 5G networks and network slicing are expected to be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. One major enhancement for LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever-increasing growth of wireless data traffic.

BRIEF DESCRIPTION OF THE DRAWINGS

FIG. 8 is an example configuration of an ATTACH ACCEPT message for provisioning URSP rules according to various aspects described herein.

FIG. 9 is an example configuration of an TRACKING AREA UPDATE (TAU) ACCEPT message for provisioning URSP rules according to various aspects described herein.

FIG. 12 is another example UE policy procedure for UE policy delivery in accord with various aspects.

DETAILED DESCRIPTION

Figure 1:
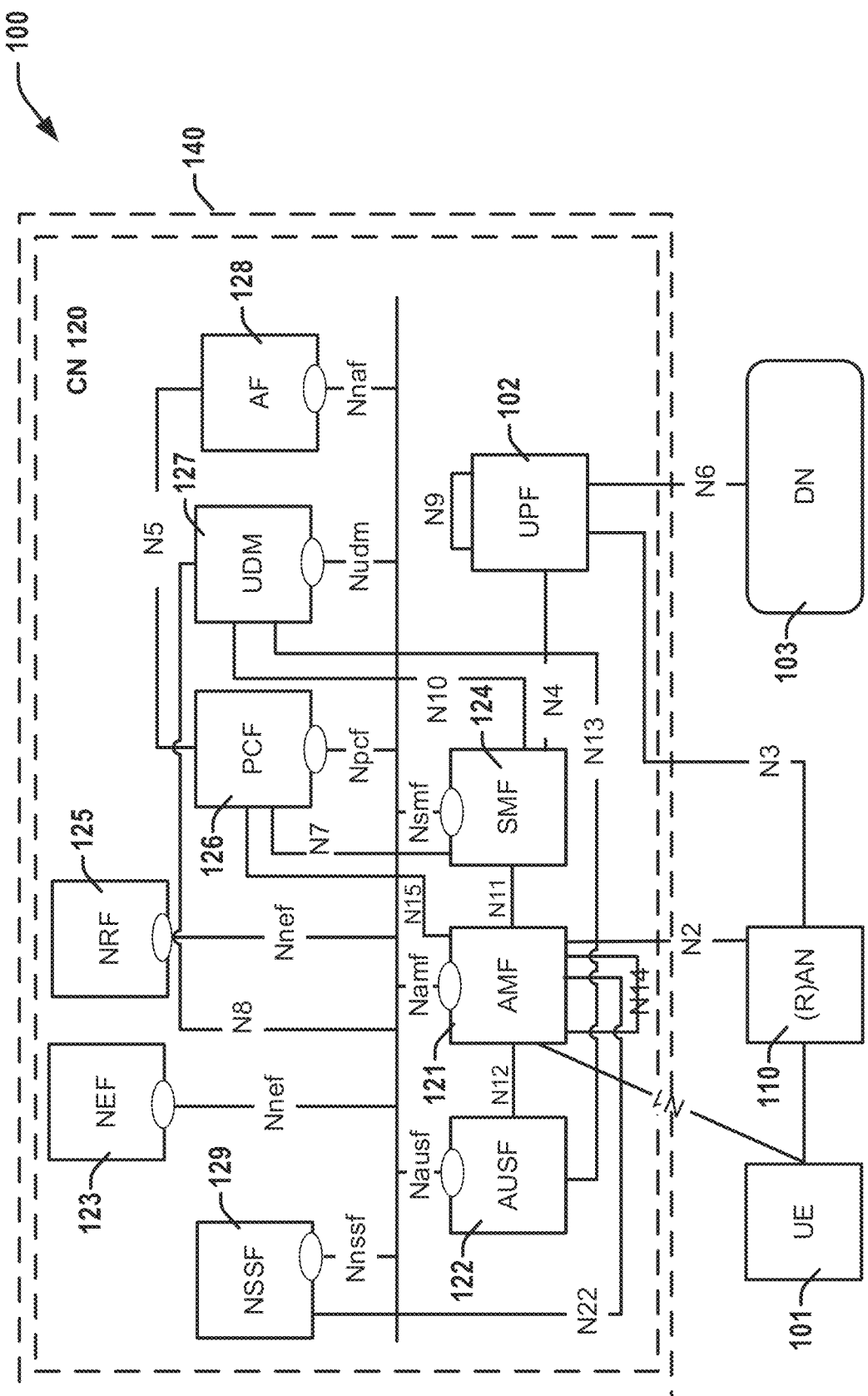
FIG. 1 is a block diagram illustrating another example of network function components (NFs) and interfaces of an NR network architecture that can be employed in accordance with various aspects described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects of this disclosure include mechanisms for user equipment (UE) policy enhancement so that a UE can be provisioned with consistent UE route selection policy (URSP) rules across a 5G core network and an evolved packet system (EPS) of a 4G network in response to cell mobility or changing parameters of URSP rules. Currently, 4G network systems do not have adequate mechanisms for installing new services in the network for a UE. In 5G networks, a slice selection policy can be configured dynamically through the URSP, for example, but this is pre-defined and not changed dynamically in the EPS of a 4G network. The EPS of 4G networks can sometimes implement an access network discovery and selection function (ANDSF) component that includes a collection of management objects with different management policies, delivered as tables of information. The ANDSF component of a 4G core network can enable mobile operators to set network management policies and priorities, and further control where, when, and under what circumstances a subscriber device connects to a network. However, some networks have no ANDSF component deployments. In this situation, when the UE is operating in EPS, the UE may not have URSP rules provisioned already and no current way to provision URSP rules in EPS. Thus, there is a need to support the mapping of URSP rules of 5G systems (5GS) in EPS, especially for legacy UEs such as pre-Release-18 UEs, and the updating/provisioning of these URSP rules to such UEs in EPS. As such, enhancements are disclosed herein for updating/provisioning UEs with consistent URSP policies across 5G networks and the EPS of 4G networks.

A UE can use URSP rules to define the conditions for associating an application to a packet data network (PDN) connection when attached to the EPC. If the UE does not have preconfigured rules for associating an application to a PDN connection, or when the UE does not have rules in a UE local configuration and is not provisioned with ANDSF rules, the UE can be configured to use a matching URSP rule, if available, to derive parameters (e.g., an access point name (APN), or the like), for PDN connection establishment and associate an application to the PDN connection. A UE can use a route selection component (e.g., a data network name (DNN)) in a URSP rule in EPS, but when the URSP rule is updated at the network side, there is no current way to provision the URSP rule to UE in EPS. As such, different mechanisms for provisioning a UE with URSP in EPS can be configured and implemented in order to configure the UE with consistent URSP across both EPS and 5GS, especially where ANDSF is not deployed in the network.

In an aspect, a UE can perform a capability exchange with the network or base station (e.g., a gNB, or the like). The UE can indicate its capability to handle the provisioning of URSP rules in a UE Network Capability Information Element (IE) by using an ATTACH REQUEST message or a TRACKING AREA UPDATE (TAU) REQUEST message as a part of the Attach procedure to the network or the tracking area update procedure, respectively. In turn, the network can indicate whether it supports URSP policy updates in an EPS Network Feature Support IE by using an ATTACH ACCEPT message or a TAU ACCEPT message.

Additionally, or alternatively, in an aspect the UE can receive and process a downlink (DL) generic non-access stratum (NAS) transport (DL GENERIC NAS TRANSPORT) message that includes a UE policy container with UE route selection policy (URSP) rules associated with the 5G network based on the UE capability information provided. The UE can obtain needed parameters from the URSP rules associated with the 5G network to establish a PDN connection in an EPS of a 4G network. An acknowledgement (ACK) in an uplink (UL) generic NAS transport (UL GENERIC NAS TRANSPORT) message can be provided by the UE in response to receiving the DL GENERIC NAS TRANSPORT message.

FIG. 1 illustrates an architecture of a system 100 including a core network (CN) 120 in accordance with various aspects. The system 100 is illustrated to include a UE 101, which can be the same or similar to other UEs discussed herein, and represent one or more UEs of one or more legacy UEs. The system 100 includes radio access network (R)AN 110 or access node (AN); and a data network (DN) 103, which can be, for example, operator services, Internet access or 3rd party services; and a 5G Core (5GC) 120 or a 4GC 130. The 5GC 120 can include an Authentication Server Function (AUSF) 122; an Access and Mobility Function (AMF) 121; a Session Management Function (SMF) 124; a Network Exposure Function (NEF) 123; a Policy Control Function (PCF) 126; a Network Function Repository Function (NRF) 125; a Unified Data Management (UDM) 127; an application function (AF) 128; a user plane function (UPF) 102; and a Network Slice Selection Function (NSSF) 129, each with respective components for processing corresponding 5GC network functions (NFs) or performance measurements related thereto as network functions associated with any one or more of the aspects herein. Tunnelling or persistent transport connections associated with any aspects can include a stream, connection such as a logical channel, logical connection, or the like, which can be used for measurement task/activities/jobs associated with the network functions and related measurements, key performance indicators (KPIs), or service-based communications for the network, for example.

The UPF 102 can act as an anchor point for intra-RAT and inter-RAT mobility, an external protocol data unit (PDU) session point of interconnect to data network (DN) 103, and a branching point to support multi-homed PDU session. The UPF 102 can also perform packet routing and forwarding, perform packet inspection, enforce the user plane part of policy rules, lawfully intercept packets, perform traffic usage reporting, perform Quality of Service (QoS) handling for a user plane (e.g., packet filtering, gating, uplink (UL)/downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception (user plan (UP) collection) of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the security anchor function (SEAF) that it uses to derive access-network specific keys. Furthermore, AMF 121 can be a termination point of a RAN CP interface or RAN connection point interface, which can include an N2 reference point between the (R)AN 110 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 210 and the AMF 121 for the control plane, and can be a termination point for the N3 reference point between the (R)AN 210 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR) (not shown).

The UE 101 can register with the AMF 121 in order to receive network services. Registration Management (RM) is used to register or deregister the UE 101 with the 5G network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 does not hold valid location or routing information for the UE 101, so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among other procedures.

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the Access Network (AN) (e.g., Radio Resource Control (RRC) connection or UE-N3IWF connection for non-3GPP access or an evolved Packet Data Gateway (ePDG)) and the N2 connection for the UE 101 between the AN (e.g., RAN or memory 330) and the AMF 121.

The SMF 124 can be responsible for SM (e.g., session establishment, modify and release, including tunnel maintain between UPF and AN node 110); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to the management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request (e.g., an Access Request message in an access procedure), and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for a third party, internal exposure/re-exposure, Application Functions (e.g., AF 128), edge computing or fog computing systems, etc. In such aspects, the NEF 123 can authenticate, authorize, or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code, where a job or measurement instance includes a particular task or measurement activity to measure any particular parameter, metric, related to a KPI for any of the NFs. Additionally, the NRF 125 can exhibit the Nnrf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application front end (FE) and a Uniform Data Repository (UDR) (not shown). The UDR can store subscription data and policy data for the UDM 127 and the PCF 126, or structure data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NS-SAIs), if needed. The NSSF 129 can also determine the AMF set to be used to serve the UE 101, or a list of candidate AMF(s) 121 based on a suitable configuration and possibly based on querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown). Additionally, the NSSF 129 can exhibit a Nnssf service-based interface.

Additionally, there can be many more reference points or service-based interfaces between the NF services in the NFs; however, these interfaces and reference points have been omitted from FIG. 1 for clarity. In one example, the CN 120 can include a Nx interface, which can be an inter-CN interface between the Mobility Management Entity (MME) and the AMF 121 in order to enable interworking between CN 120 and another CN 140 such as an EPS of a 4G network. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can be considered or include a component as referred to herein.

Figure 2:
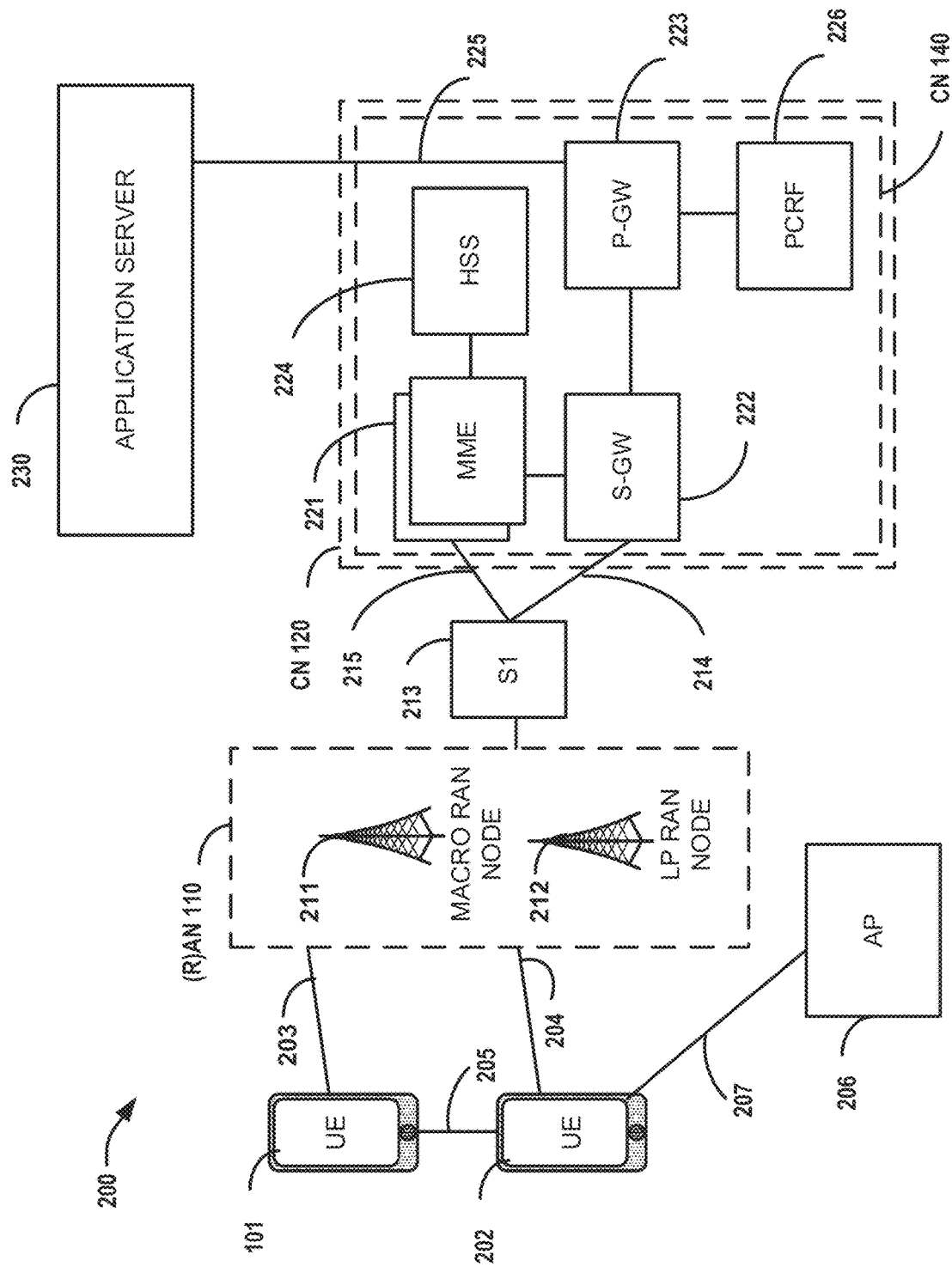
FIG. 2 is a block diagram illustrating another example of network function components (NFs) and interfaces of an EPS network architecture that can be employed in accordance with various aspects described herein

Aspects described herein can be implemented into a system or network device using any suitably configured hardware or software. FIG. 2 illustrates an architecture of a network in accordance with various aspects described herein. The system 200 is illustrated to include the UE 101, the (R)AN 110 and the 4G CN 140 of FIG. 1 to further illustrate components of 4G CN 140 for interworking with 5G CN 120 as in cell mobility operations between these networks. The UE 101 can also be communicatively coupled to another UE 202, either of which can further represent new radio (NR) devices (e.g., a Rel-18 UE) or a Rel-15 UE, Rel-16 UE, Rel-17 UE or other a UE beyond Rel-18, for example, as discussed herein.

As used herein, the term "user equipment" or "UE" can refer to a device with radio communication capabilities and can describe a remote user of network resources in a communications network. The term "user equipment" or "UE" can be considered synonymous to, and can be referred to as client, mobile, mobile device, mobile terminal, user terminal, mobile unit, mobile station, mobile user, subscriber, user, remote station, etc. Furthermore, the term "user equipment" or "UE" can include any type of wireless/wired device or any computing device including a wireless communications interface. In this example, UEs 101 and 202 are illustrated as smartphones (e.g., handheld touchscreen mobile computing devices connectable to one or more cellular networks), but can also comprise any mobile or non-mobile computing device, such as consumer electronics devices, cellular phones, etc.

In some aspects, any of the UEs 101 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 202 can be configured to connect, e.g., communicatively couple, with a radio access network (RAN) 110. The RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 202 utilize connections (or channels) 203 and 204, respectively, each of which comprises a physical communications interface or layer (discussed in further detail infra). As used herein, the term "channel" can refer to any transmission medium, either tangible or intangible, which is used to communicate data or a data stream. The term "channel" can be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" can refer to a connection between two devices through a Radio Access Technology (RAT) for the purpose of transmitting and receiving information. In this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this aspect, the UEs 101 and 202 can further directly exchange communication data via a ProSe interface 205. The ProSe interface 205 can alternatively be a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 205 can be used in vehicular applications and communications technologies, which are often referred to as V2X systems.

The UE 202 is shown to be configured to access an access point (AP) 206 (also referred to as "WLAN node 206", "WLAN 206", "WLAN Termination 206" or "WT 206" or the like) via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system. In various aspects, the UE 202, RAN 110, and AP 206 can be configured to utilize LTE-WLAN aggregation (LWA) operation and/or WLAN LTE/WLAN Radio Level Integration with IPsec Tunnel (LWIP) operation. The LWA operation can involve the UE 202 in RRC_CONNECTED being configured by a RAN node 211, 212 to utilize radio resources of LTE and WLAN. LWIP operation can involve the UE 202 using WLAN radio resources (e.g., connection 207) via Internet Protocol Security (IPsec) protocol tunneling to authenticate and encrypt packets (e.g., internet protocol (IP) packets) sent over the connection 207. IPsec tunneling can include encapsulating entirety of original IP packets and adding a new packet header, thereby protecting the original header of the IP packets.

The RAN 110 can include one or more access nodes that enable the connections 203 and 204. As used herein, the terms "access node," "access point," or the like can describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" can refer to any transportation infrastructure entity implemented in or by a gNB/eNB/RAN node or a stationary (or relatively stationary) UE, where an RSU implemented in or by a UE can be referred to as a "UE-type RSU", an RSU implemented in or by an eNB can be referred to as an "eNB-type RSU." The RAN 110 can include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 101 and 202. In some aspects, any of the RAN nodes 211 and 212 can fulfill various logical functions for the RAN 110 including, but not limited to, radio network controller (RNC) functions such as radio bearer management, uplink and downlink dynamic radio resource management and data packet scheduling, and mobility management.

In accordance with some aspects, the UEs 101 and 202 can be configured to communicate using Orthogonal Frequency-Division Multiplexing (OFDM) communication signals with each other or with any of the RAN nodes 211 and 212 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or SL communications). The OFDM signals can comprise a plurality of orthogonal subcarriers.

The physical downlink shared channel (PDSCH) can carry user data and higher-layer signaling to the UEs 101 and 202. The physical downlink control channel (PDCCH) can carry information about the transport format and resource allocations related to the PDSCH channel, among other things. It can also inform the UEs 101 and 202 about the transport format, resource allocation, and Hybrid Automatic Repeat Request (HARQ) information related to the uplink (UL) shared channel. Typically, downlink (DL) scheduling (assigning control and shared channel resource blocks to the UE 202 within a cell) can be performed at any of the RAN nodes 211 and 212 based on channel quality information fed back from any of the UEs 101 and 202. The downlink resource assignment information can be sent on the PDCCH used for (e.g., assigned to) each of the UEs 101 and 202.

The RAN 110 is illustrated as communicatively coupled to a core network (CN) 120 via an S1 interface 213. In aspects, the CN 120 can be an evolved packet core (EPC) network, a NextGen Packet Core (NPC) network, or some other type of CN. In this aspect the S1 interface 213 is split into two parts: an S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this aspect, the CN 120 comprises the MMEs 221, the S-GW 222, the Packet Data Network (PDN) Gateway (P-GW) 223, and a home subscriber server (HSS) 224. The MMEs 221 can be similar in function to the control plane of legacy Serving General Packet Radio Service (GPRS) Support Nodes (SGSN). The MMEs 221 can manage mobility aspects in access such as gateway selection and tracking area list management. The HSS 224 can comprise a database for network users, including subscription-related information to support the network entities' handling of communication sessions. The CN 120 can comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 can terminate the S1 interface 213 towards the RAN 110, and routes data packets between the RAN 110 and the CN 120. In addition, the S-GW 222 can be a local mobility anchor point for inter-RAN node handovers and also can provide an anchor for inter-3GPP mobility between cells or networks (e.g., 5G CN 120 and 4G CN 140). Other responsibilities can include lawful intercept, charging, and some policy enforcement.

The P-GW 223 can terminate an SGi interface toward a PDN. The P-GW 223 can route data packets between the EPC network 120 and external networks such as a network including the application server 230 (alternatively referred to as application function (AF)) via an Internet Protocol (IP) interface 225. Generally, the application server 230 can be an element offering applications that use IP bearer resources with the core network (e.g., UMTS Packet Services (PS) domain, LTE PS data services, etc.). In this aspect, the P-GW 223 is illustrated as communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 101 and 202 via the CN 120.

The P-GW 223 can further be a node for policy enforcement and charging data collection. Policy and Charging Rules Function (PCRF) 226 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within an HPLMN and a Visited PCRF (V-PCRF) within a Visited Public Land Mobile Network (VPLMN). The PCRF 226 can be communicatively coupled to the application server 230 via the P-GW 223. The application server 230 can signal the PCRF 226 to indicate a new service flow and select the appropriate Quality of Service (QoS) and charging parameters. The PCRF 226 can provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
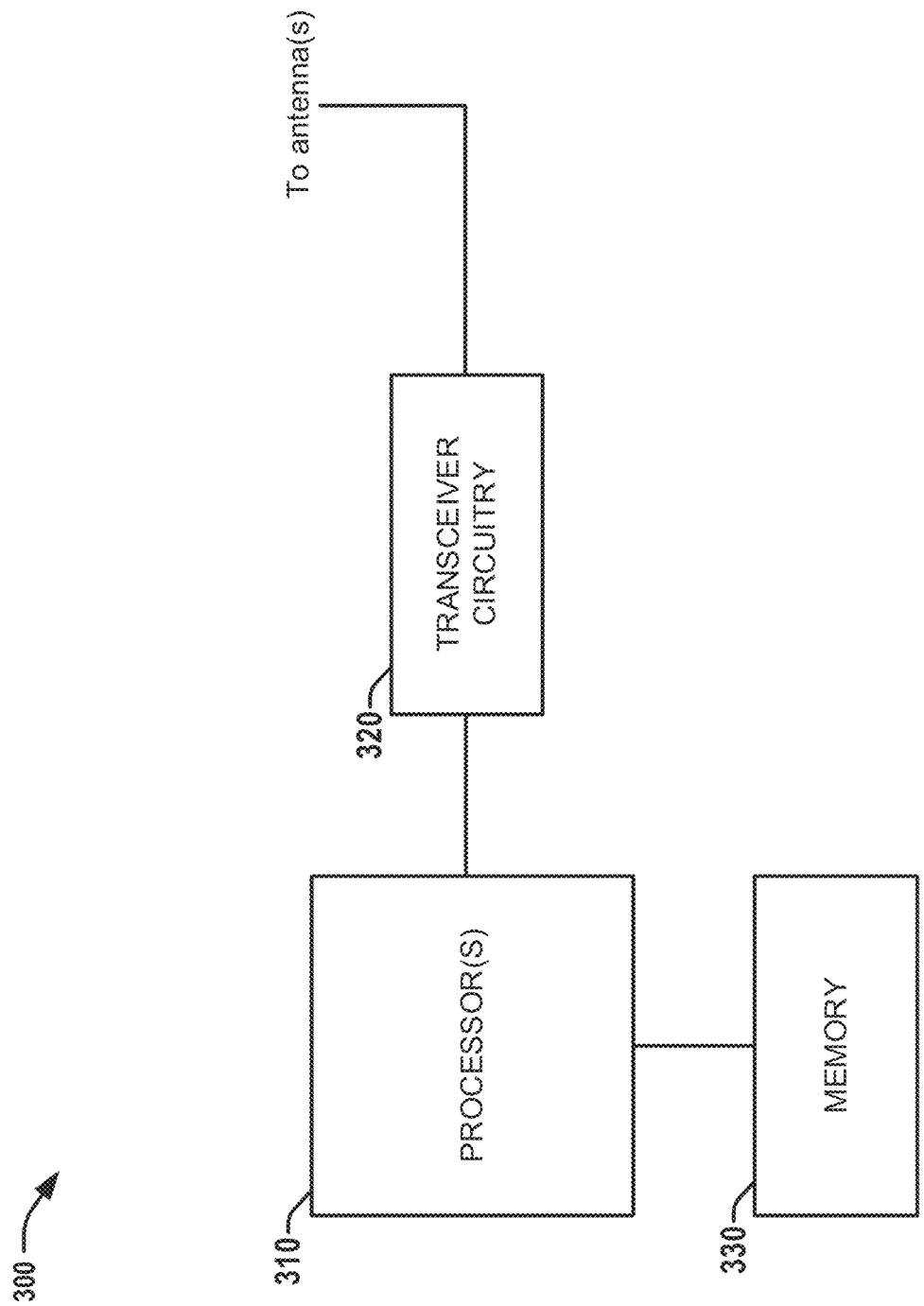
FIG. 3 is a block diagram illustrating a system employable at a UE or gNB, according to various aspects described herein.

Referring to FIG. 3, illustrated is a block diagram of a system or device 300 employable at a UE (e.g., UE 101 or 202), a next generation Node B (gNodeB or gNB) or other base station (BS) (e.g., RAN 110)/TRP (Transmit/Receive Point), or a component of a 3GPP (Third Generation Partnership Project) network (e.g., a 5GC (Fifth Generation Core Network)) component such as a UPF 102)) that facilitates generation or communication of performance measurements associated with one or more of a PDU (Protocol Data Unit) session or an N4 session, in accord with various aspects.

System or device 300 can include processor(s) 310 comprising processing circuitry and associated interface(s) (e.g., a communication interface for communicating with communication circuitry 320, a memory interface for communicating with memory 330, etc.), communication circuitry 320 (e.g., comprising circuitry for wired or wireless connection(s), such as transmitter circuitry (e.g., associated with one or more transmit chains) or receiver circuitry (e.g., associated with one or more receive chains), wherein transmitter circuitry and receiver circuitry can employ common or distinct circuit elements, or a combination thereof), and a memory 330 (which can comprise any of a variety of storage mediums and can store instructions or data associated with one or more of processor(s) 310 or the communication circuitry 320 as transceiver circuitry).

In BS embodiments (e.g., system or device 300 of a gNB) and network component (e.g., UPF (User Plane Function), etc.) embodiments (e.g., system 300 of a UPF) processor(s) 310 of the gNB (etc.), communication circuitry 320 (etc.), and memory 330 (etc.) can be in a single device or can be included in different devices, such as part of a distributed architecture. In embodiments, signaling or messaging between different embodiments of system 300 can be generated by processor(s) 310, transmitted by communication circuitry 320 over a suitable interface or reference point (e.g., N4, etc.), received by communication circuitry 320, and processed by processor(s) 310, which can also include or have integrated therein the memory 330.

In aspects, the UE 101/202 can be provisioned withe UE route selection policy (URSP) rules by the PCF 126 of FIG. 1 of an HPLMN, in which the UE is prepared and equipped by the network to allow providing of services to the users. This can include altering the state of an existing priority service or capability, including monitoring access rights and privileges to ensure security to resources, privacy and network compliance. A URSP policy includes a prioritized list of the URSP rules. The URSP rules can include a rule precedence, a traffic descriptor, application descriptors, IP descriptors, Domain descriptors, Non-IP descriptors, a DNN, connection capabilities, a list of route selection descriptors and the like. A rule precedence determines the order the URSP rule is enforced in the UE 101/202. Traffic descriptors can include a qualitative value that describes the data flow (e.g., a constant bit rate (CBR)), or traffic characteristics that in an asynchronous transfer mode (AIM) describe a set of traffic parameters associated with a source end point.

When the UE 101/202 is roaming, the PCF 126 in the HPLMN can update the URSP rule in the UE 101/202. In addition, the UE can be also pre-configured with URSP rules (e.g. by the operator). Only the URSP rules provisioned by the PCF 126 could be used by the UE 101/202, if both URSP rules provisioned by the PCF 126 and pre-configured URSP rules are available at the UE 101/202. If no URSP rule is provisioned by the PCF 126, and the UE 101/202 has pre-configured rules configured in both the USIM and ME, then only the pre-configured URSP rules in the USIM is used. If the PCF 126 receives application guidance for URSP determination that may apply to the UE 101/202 from a unified data repository (UDR), the PCF 126 can verify the requested parameters with regards to the existing URSP rules and (re-)compose the URSP rules for the UE 101/202.

Figure 4:
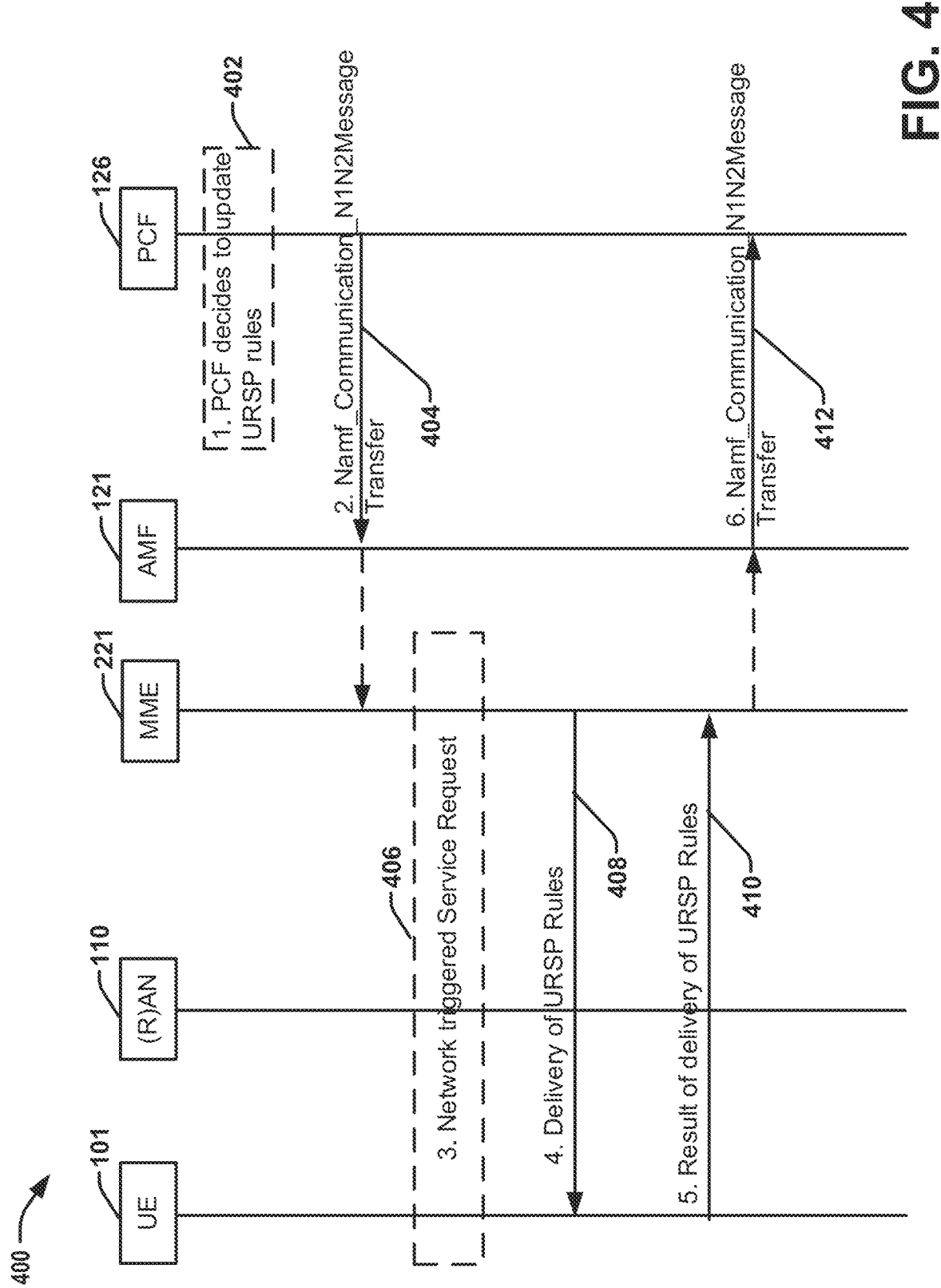
FIG. 4 is an example UE policy procedure for UE policy delivery in accord with various aspects.

Referring to FIG. 4, illustrated is an example UE policy procedure 400 for UE policy delivery in accord with various aspects.

At 402, the PCF 126 decides to update UE policy based on trigger conditions such as attach procedure with an attach accept message in EPS, a tracking area update, an attach message when the UE 101 moves from 5GS to EPS, or when the PCF 126 determines that the UE policy needs to be updated.

At 404, the PCF 126 invokes a Namf_Communication_N1N2Message Transfer service operation provided by the AMF 121. The AMF 121 in turn communicates this to MME 221.

At 406, the MME 221 transparently transfers the UE Policy container to the UE 101 via the 3GPP access. If the UE 101 is in connection management (CM)-IDLE, the MME 221 pages the UE 101, and upon reception of the paging request, the UE 101 initiates a UE triggered service request procedure.

At 408, if the UE is in CM-CONNECTED, the MME 221 transparently transfers the UE Policy container, which includes the UE policy information with URSP rules to the UE (using a downlink (DL) GENERIC NAS TRANSPORT message). The UE Policy container includes the list of Policy Sections for the URSP rules.

At 410, the UE 101 updates the UE policy provided by the PCF 126 and sends the result to the MME 221 (using UL GENERIC NAS TRANSPORT message).

At 412, if the PCF 126 is to be notified of the reception of the UE Policy container, then the MME 221 forwards the response of the UE 101 to AMF 121, which in turn forwards it to PCF 126 using Namf_Communication_N1MessageNotify.

The UE 101 is configured to indicate its capability to support provisioning of URSP information in EPS in a UE network capability IE as part of Attach and TAU procedures. The UE 101 processes URSP information received in a UE Policy container and updates URSP policies. Then the UE 101 sends the result of UE Policy delivery to MME 221.

The MME 221 is configured to indicate its capability to support provisioning of URSP information in EPS in a EPS network feature support IE, for example, as part of Attach and TAU procedures. The MME 221 pages the UE 101 when URSP information has to be delivered to UE 101 and the UE 101 is in CM-IDLE. The MME 221 transfers the UE Policy container transparently to the UE 101 and further transfers the result of UE Policy delivery in EPS to AMF 121.

The PCF 126 is configured to initiate transfer of URSP rules to the UE 101 in EPS. The AMF 121 is configured to transfers the UE Policy container transparently to the MME 221 and transfer the result of UE Policy delivery in EPS to PCF 126.

Figure 5:
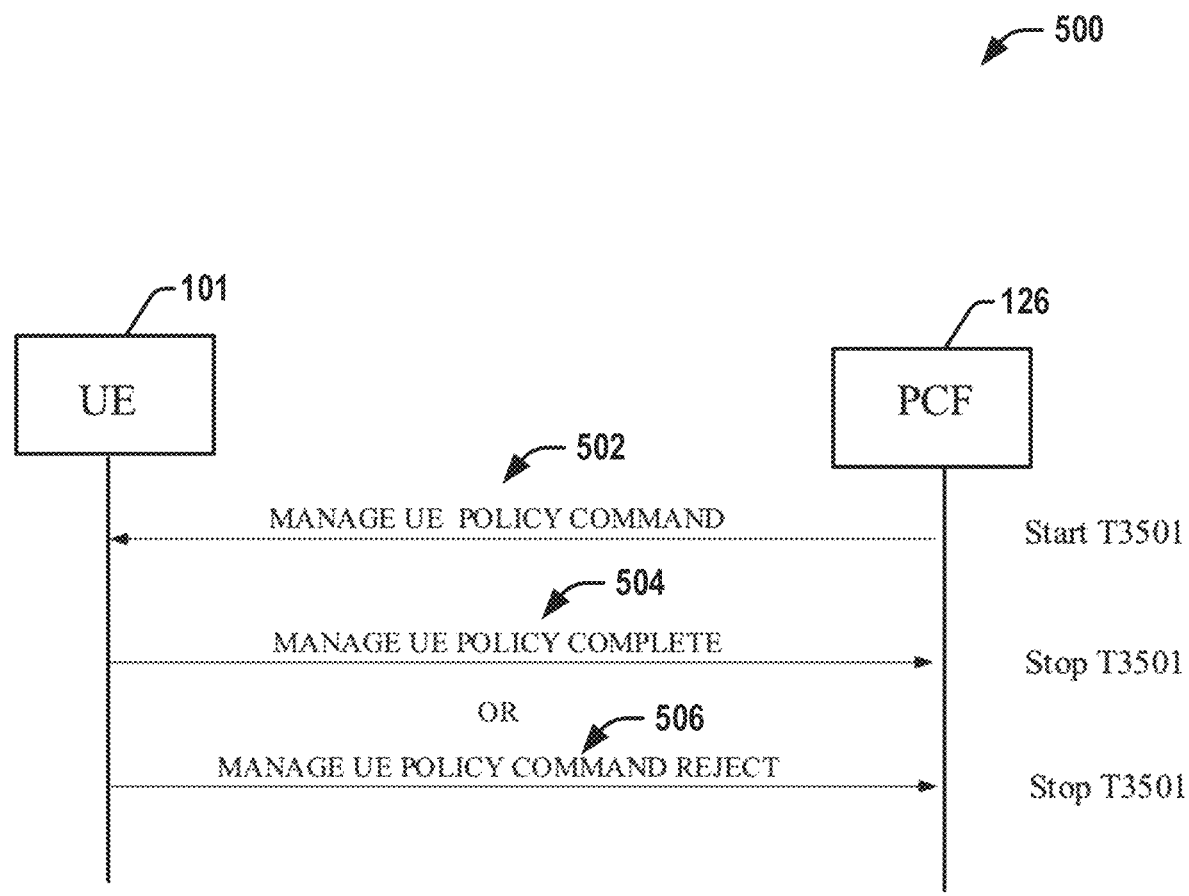
FIG. 5 is another call flow of a manage UE policy command that can be employed in accordance with various aspects/aspects described herein.

Referring to FIG. 5, illustrated is an example UE policy management procedure 500 in accord with various aspects. In order to initiate UE policy management procedure 500 as a network-requested UE policy management procedure triggered by a UE-requested V2X policy provisioning procedure or the UE-requested ProSeP policy provisioning procedure, the PCF 126 set a procedure transaction ID (PTI) information element (IE) to a PTI value of the received UE POLICY PROVISIONING REQUEST message of the UE-requested V2X policy provisioning procedure or the UE-requested ProSeP policy provisioning procedure; otherwise, a PTI value is allocated that is currently not used and set the PTI IE is set to the allocated PTI value. The PCF 126 can encode the information about the UE policy sections to be added, modified or deleted in a UE policy section management list IE and include this in a MANAGE UE POLICY COMMAND message 502. The MANAGE UE POLICY COMMAND message 502 can be sent to the UE via the AMF 121 and a start timer T3501 initiated for each PTI value.

Upon receipt of the MANAGE UE POLICY COMMAND message with a PTI value currently not used by a network-requested UE policy management procedure, for each instruction included in the UE policy section management list IE, the UE 101 can store the received UE policy section of the instruction, if the UE 101 has no stored UE policy section associated with a same UE policy section identifier (UPSI) as a UPSI associated with the instruction. The UE 101 can replace the stored UE policy section with the received UE policy section of the instruction, if the UE has a stored UE policy section associated with the same UPSI as the UPSI associated with the instruction. Alternatively, the UE 101 can delete the stored UE policy section, if the UE 101 has a stored UE policy section associated with the same UPSI as the UPSI associated with the instruction and the UE policy section contents of the instruction is empty. If all instructions included in the UE policy section management list IE were executed successfully by the UE 101, the UE 101 can generate a MANAGE UE POLICY COMPLETE message 504 including the PTI value received within the MANAGE UE POLICY COMMAND message 502, and transmit the MANAGE UE POLICY COMPLETE message 504 using a NAS transport procedure.

Upon receipt of the MANAGE UE POLICY COMPLETE message 504, the PCF 126 can stop timer T3501. PCF 126 then ensures that the PTI value assigned to this procedure is not released immediately. If the UE could not execute all instructions included in the UE policy section management list IE successfully, the UE 101 can set the PTI IE to the PTI value received within the MANAGE UE POLICY COMMAND message 502, encode the UPSI associated with the instructions that could not be executed successfully and the associated UE policy delivery service cause. A UE policy section management result IE can be included in a MANAGE UE POLICY COMMAND REJECT message 506 to indicate the cause of failure. UE 101 can provide the MANAGE UE POLICY COMMAND REJECT message 506 using a NAS transport procedure. Upon receipt of the MANAGE UE POLICY COMMAND REJECT message 506, the PCF 126 can stop timer T3501 and ensure that the PTI value assigned to this procedure is not released immediately.

Figure 6:
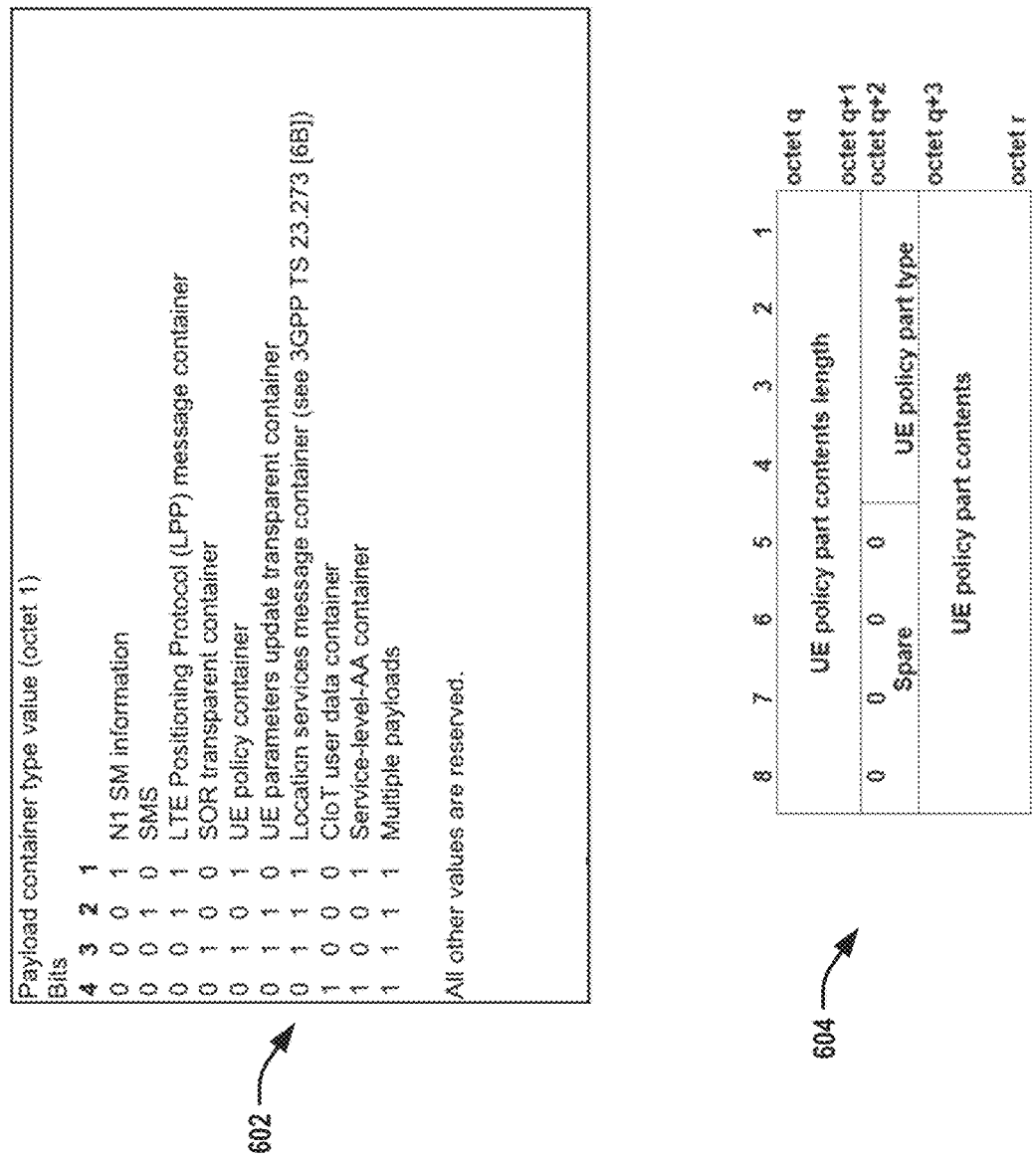
FIG. 6 is an example configuration of provisioning messages according to various aspects described herein.

Referring to FIG. 6, illustrated is an example of message 600 including a payload container type IE 602 in accord with various aspects. A NAS message in 5GC 120, such as a downlink NAS transport (DL NAS TRANSPORT), can be provided by AMF 121 to the UE 101/202. When the AMF 121 communicates to the UE 101/202, the NAS message (e.g., DL NAS TRANSPORT message) can be used to transfer data from the AMF 121 to the UE 101/202, and in particular, be used to transport URSP policies from the network side to the UE 101/202, as a part of the MANAGE UE POLICY COMMAND message 502, for example. The AMF 121 can configure the DL NAS TRANSPORT message with a payload container type IE 602 having different data elements, including, for example, SMS, LTE positioning information, steering of roaming (SOR) transparent containers, a UE policy container 604, and other payload information such as an IoT data container, for example. The UE policy container 604 among these different payloads can be associated with a particular value in a payload container type IE 602. In particular, the DL NAS TRANSPORT message can include the UE policy type information to indicate different types of policies: URSP, Access Network Discovery and Selection Policy (ANDSP) for ANDSF, V2X messages and ProSeP policy, via with the value associated with the UE policy container 604 in order to transfer policies.

The MANAGE UE POLICY COMMAND message 502 sent via the AMF 121, which can set the UE policy part type of the UE policy container 604 as at least one of the following: 1: URSP, 2: ANDSP, 3: V2XP, 4: ProSeP. The AMF 121 can transport of UE Policy is by NAS messages in 5GC 520 by using a transparent container included in NAS transport message to the UE 101. The AMF 121 configures the DL NAS TRANSPORT message to deliver policy from PCF 126 to UE 101. The UE 101 can use a UL NAS TRANSPORT message to acknowledge (ACK) receipt of policy from PCF 126 when an ACK is requested, while the payload container type IE 602 indicates the payload 604 included therein.

In 5GC 120, the DL NAS TRANSPORT message can be configured to transfer the data elements as described above. In 4GC 140, a DL GENERIC NAS TRANSPORT message can be configured. The MME 221 can use the DL GENERIC NAS TRANSPORT to transfer data elements from the network 120 to the UE in a 4G network. In 4GC 140, a payload with a generic message container type and a generic message container can be configured, but currently not necessarily with a UE policy container, but rather using LTE Positioning Protocol (LPP) messages with Location services messages, for example, but without a UE policy container.

The 5G system (5GS) of the 5G core network 120 and the EPS of 4G core network 140 can share a common/combined PCF 126+PCRF 226. To support interworking IWK with EPC, a common/combined SMF 124+PGW 223 control plane (PGW-C) can provide information over the interface N4 to UPF 102+PGW 223 user plane (PGW-U) related to the handling of traffic over an S5 user plane used to handle the traffic. ANDSF rules are provisioned use an IP based interface—S14 (which is not going over NAS, rather than an independent IP level interface that can operate over 3GPP IP access or non-3GPP IP access), but EPS may not have any ANDSF rules as ANDSF is not widely deployed.

In an aspect, URSP rules can be provisioned in EPS from the 5GC 120 by configuring a NAS transport message to transport policy components. In particular, the MME 221 can generate a downlink generic NAS transport (DL GENERIC NAS TRANPORT) message. This DL GENERIC NAS TRANPORT message can be configured to include the UE policy container from the 5GC 120 for provisioning URSP rules in the 4GC 140. For example, UE 101 (also as UE 202 when referred to herein) can receive DL GENERIC NAS TRANSPORT message from the MME that includes a UE policy container with URSP rules associated with a 5G network (e.g., 5GC 120) in response to providing UE capability information. The UE capability information can indicate the UE's capability for provisioning URSP rules of the 5GC 120 network for the EPS of the 4G network (e.g., 4GC 140). The UE 101 can then be configured to obtain parameters from the URSP rules associated with the 5GC 120 network to establish a PDN connection in an EPS of a 4GC 140 network. The UE can be further configured to provide an ACK (or NACK) in an uplink UL generic NAS transport (UL GENERIC NAS TRANSPORT) message in response to receiving the DL GENERIC NAS TRANSPORT message.

Alternatively, or additionally, the UE 101 can receive the UE policy container with URSP rules associated with a 5G network (e.g., 5GC 120) as a part of an Attach procedure in an Attach Accept (ATTACH ACCEPT) message. The ATTACH ACCEPT message can be configured in an EPS Network Feature Support IE indicating the network's support (e.g., from the MME 221) for a URSP policy update/provisioning in 4GC 140. This can be provided from the MME 221 when the UE indicates its UE capability to handle provisioning URSP rules in a UE Network Capability IE in an Attach Request (ATTACH REQUEST) message. For example, the Attach message can be sent in an initial UE message to the MME 221 (e.g., ova n S1AP interface). The ATTACH REQUEST message can be a part of or embedded in the initial UE message to the MME 221.

Alternatively, or additionally, the UE 101 can receive a Tracking Area Update (TAU) Accept (TAU ACCEPT) message with the EPS Network Feature Support IE indicating the network's support for a URSP policy update/provisioning in 4GC 140. For example, when the UE 101 is performing a cell mobility, moving from one cell to another, such as from the 5GC 120 to the 4GC 140, and is being tracked, the UE 101 can send a TAU Request (TAU REQUEST) message with its UE capability for handing the provisioning of URSP rules in a UE Network Capability IE therein. In return, the UE 101 receives the TAU ACCEPT message with the EPS Network Feature Support IE from the network (e.g., MME 221) when moving to the 4GC 140.

The 4GC 140 and the 5GC 120 can interwork with each other so that the URSP rules can be provisioned from the 5GC 120 to the 4GC 140 or vice versa. For example, the MME 221 can communicate with the PCF 126 via backend interworking, such as, for example, via an N26 interface that establishes interworking between the PCF 126 and PCRF 226, as well as with the SMF 124 in the 5GC 120 and core network components of the 4GC 140. The parameters of the URSP rules or associated information can be then kept or stored in the EPS and the UPF 102 by the backend interworking.

Figure 7:
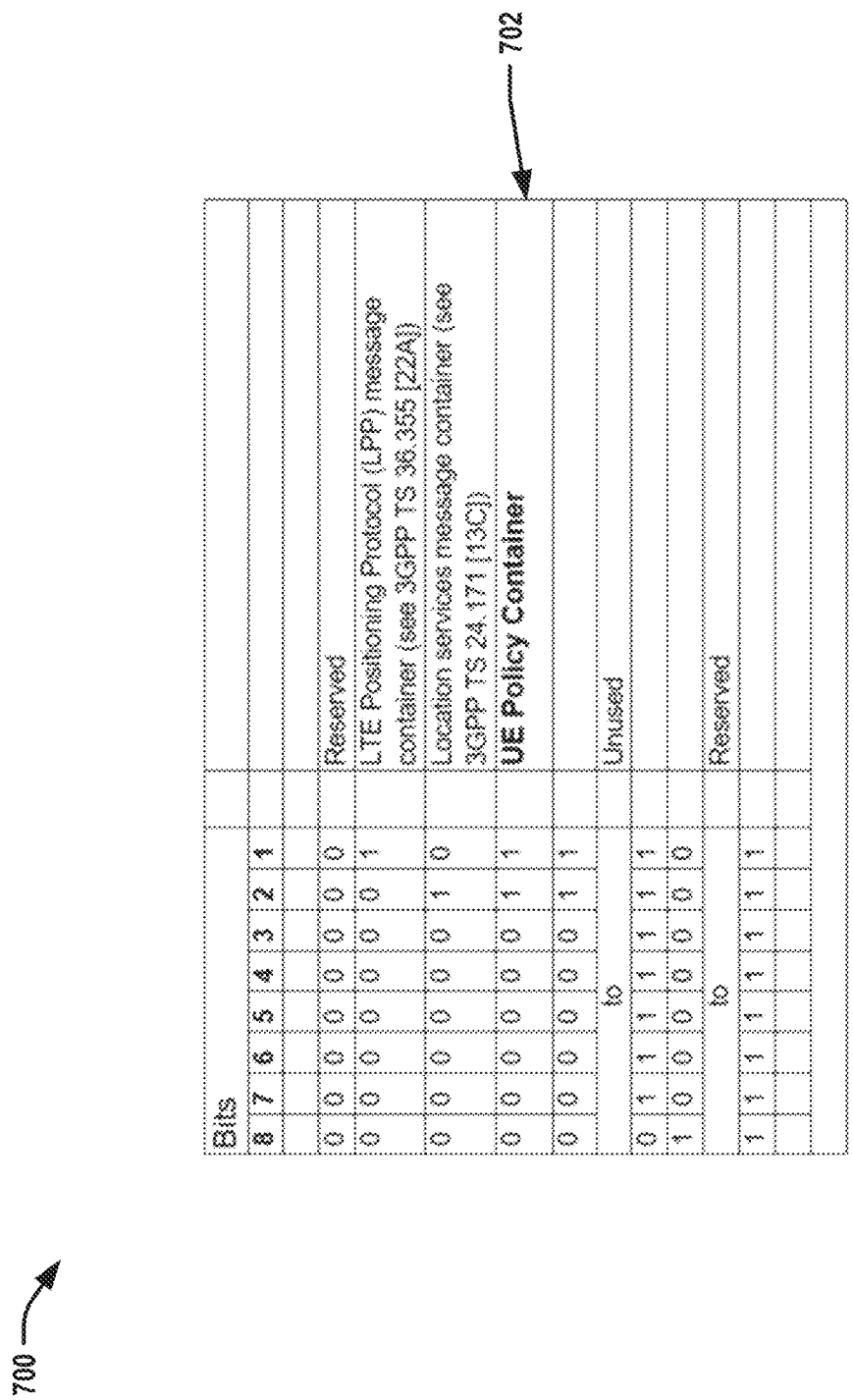
FIG. 7 is an example configuration of a generic message container type IE for provisioning UE route selection policy (URSP) rules according to various aspects described herein.

Referring to FIG. 7, illustrated is an example generic message container type IE 700 in accord with various aspects. The generic message container type IE 700 can be configured with the UE policy container (e.g., UE policy container 702) along with a generic message container type as indicated by the bit value.

In an aspect, the UE 101 can be provisioned with URSP rules across the 4GC 140 and 5GC 120 using NAS messaging in order to initially provide the UE 101 with URSP rules it does not have or update these rules by deliver URSP Policy Containers across both 5GC 120 and 4GC 140. The provisioning from 5GC 120 to the EPS of the 4GC 140 can be initiated by a network using the DL NAS GENERIC TRANSPORT message at any time after the UE 101 has attached and established a PDU session. Alternatively, or additionally, the UE 101 can indicate its UE capability to handle Provisioning URSP rules in UE Network Capability IE in Attach/TAU Request messages. The network can indicate its support of a URSP policy update/provisioning in a EPS network feature support IE in an ATTACH ACCEPT message when initially attaching to the 4GC 140 via an attach procedure, or in a TAU ACCEPT message when moving across cells in a tracking area where parameters of the URSP rule differ. Each of these messages, including the DL NAS GENERIC TRANSPORT messages, a ATTACH ACCEPT message, or a TAU ACCEPT message, can comprise the generic message container type IE 700 of the 5GC 120 with the UE policy container 702. For example, the DL GENERIC NAS TRANSPORT message comprises a generic message container type IE 700 that includes the UE policy container 702 of the 5G network for the EPS of the 4G network associated with a bit value. The bit value of the UE policy container 702 indicates a presence of UE policy type information for establishing a packet data network (PDN) connection in the EPS of the 4G network. Similarly, an ATTACH ACCEPT message or a TAU ACCEPT message can comprise the generic message container type as UE policy type information and the generic message container IE 700.

In an aspect, the UE 101 or MME 221 communicatively coupled to or a component of the RAN 110 can configure rule precedence and rule applicability policies. For example, only rules provisioned by the PCF 126 could be configured to apply in the EPS of the 4GC 140 by the UE 101 or MME 221. If the UE 101 or MME 221 has any pre-provisioned rules or rules provisioned by other means, the UE 101 or MME 221 does not apply them, but instead configures the URSP rules provided by the PCF 126 only as taking precedence for either implementation by the UE 101 or provision by the MME 221. For example, the UE 101 or MME 221 could have ANDSF rules or rules in USIM as well, but any of these become superseded by rules provisioned by the PCF 126. Alternatively, or additionally, if there are other preconfigured rules in both USIM and a mobile equipment (ME), then the USIM rules could apply by taking precedence. Because USIM is generally more trusted and more sacred by operators as compared to any or memory and the storage in the UE. So the USIM rules take precedence over any policy or rule that is already present.

Referring to FIG. 8, illustrated is an example of an ATTACH ACCEPT message 800 with content in accord with various aspects.

With the ATTACH ACCEEPT message 800, legacy considerations can be configured further for Rel-15 UEs, Rel-16 UEs, etc. For example, if a Rel-15 UE (e.g., UE 202) connects to a Rel-18 network (e.g., 5GC 120), the components (e.g., PCF 126) of the 5GC 120 network would not immediately push the URSP rules by immediately sending a DL GENERCI NAS TRANSPORT message transport, thereby pushing the URSP rules of the Rel-18 network onto Rel-15 UEs. To avoid this unwarranted action, the UE 101 can engage in a capability negotiation with the network.

For example, when a Rel-18 UE 101 or otherwise attaches to the network in an attach procedure, when it registers with the network or attaches with the network, it can include a UE capability information message, a UE network capability IE, by the ATTACH REQUEST message. The ATTACH REQUEST message is generated with a UE network capability IE. In response thereto, the ATTACH ACCEPT message 800 can include there is EPS network feature support IE 802, which indicates all the features supported by the network. While in ATTACH REQUEST message, a UE network capability IE is configured therein, along with a payload container type or a generic container type as well as a payload container or generic container IE. In the ATTACH ACCEPT message 800, a bit can be configured to or added in the EPS network feature support IE 802 in order to indicate support for provisioning URSP rules in the 4GC 140 for the UE 101. Likewise, a bit could be added in the UE network capability IE (not shown) for indicating support for provisioning the same, URSP rules of the 5GC 120 in the EPS of 4GC 140. Thus, only if the UE 101 supports provisioning of URSP rules in EPS, will the network push the URSP rules onto the UE 101. For example, only in response to an indication (e.g., the added bit being "1", or the like) indicating that the UE capability supports provisioning URSP rules in a 4GC 140, will the network include the UE policy payload container 806 (or generic message container type IE) with a payload container type IE 804 (or generic message container type IE) in ATTACH ACCEPT message or push the UE policy container directly through a DL GENERIC NAS TRANSPORT message.

Likewise, the same configurations can apply for a TAU ACCEPT message 900 as illustrated in FIG. 9 so that when the UE 101 is undergoing a cell mobility or parameters change from one network to another, a TAU procedure can be performed for updating the URSP rules in similar manner as the ATTACH ACCEPT message. The TAU ACCEPT message 900 includes the EPS network feature support IE 902, payload container 906 (or generic message container type IE) with a payload container type IE 904 (or generic message container type IE).

In an aspect, some 5G URSP rules map to and have some significance in EPS, where other rules are not applicable in EPS (e.g., a 5G ProSe layer, a multi access preference, or the like). So not all URSP rules may be applicable in EPS. Therefore, the MME 221 or UE 101 can be configured to provision or update only the URSP rules which are the relevant URSP rules applicable in EPS, while other URSP rules should not be provisioned or updated in the UE 101 attaching or attached to the EPS of the 4GC 140 from or after moving from the 5GC 120. Out of all these applicable rules, if there is a change in related parameters, this change can then trigger (or not) updating by a provisioning operation in EPS. For example, parameters such as multi access preference, 5G ProSe layer 3, or a UE to network relay offload should not trigger a URSP rules update or (re)provisioning. URSP rules without any significance or do not map to anything significant in EPS would not be provisioned in order to be efficient for operating in a 4GC 140 with URSP rules from a 5GC 120. Otherwise, the UPSIs stored at the UE 101 and network could go out-of-synch for when or if the UE 101 returns to 5GC. If the UE 101 requires an update of its 5G URSP rules it can operate to perform a re-synchronization via registration procedures.

In an aspect, MME 221 or UE 101 can selectively update rules that are only applicable in the EPS of the 4GC 140. The parameters of the URSP rules from the 5G network in the EPS of the 4G network that are associated with the EPS of the 4G network for establishing the PDN connection could be provisioned. For example, the parameters of the URSP rules that are associated with the EPS of the 4GC 140 network can be based on one or more of: an application associated with the PDN connection, a non-seamless non-3GPP offload indication, a DNN to derive an APN, an access type preference, a Session and Service Continuity (SSC) mode, location information, or traffic category parameters for specific applications, for example.

In an aspect, when the UE 101 already has preconfigured URSP rules, ANDSF rules or some already provisioned URSP rules, a precedence of these rules can be applied also. For example, URSP rules can have precedence over any ANDSF rules and any already preconfigured rules. When new URSP rules are provisioned and are applicable, these take precedence over ANDSF rules. The applicability of the URSP rules could be determined dynamically or reset in roaming and non-roaming scenarios, for specific VPLMNs based on HPLMN policies/control. If new URSP rules are provisioned (e.g., new traffic descriptors) for already existing URSP rules (old traffic descriptors), the new URSP rules can overwrite the old URSP rules in both roaming and non-roaming scenarios. This can apply to all relevant traffic descriptors in EPS including application descriptors, non-IP descriptors, DNN information, connection capabilities, route selection, application specific traffic descriptors, NSWO, etc.

Figure 10:
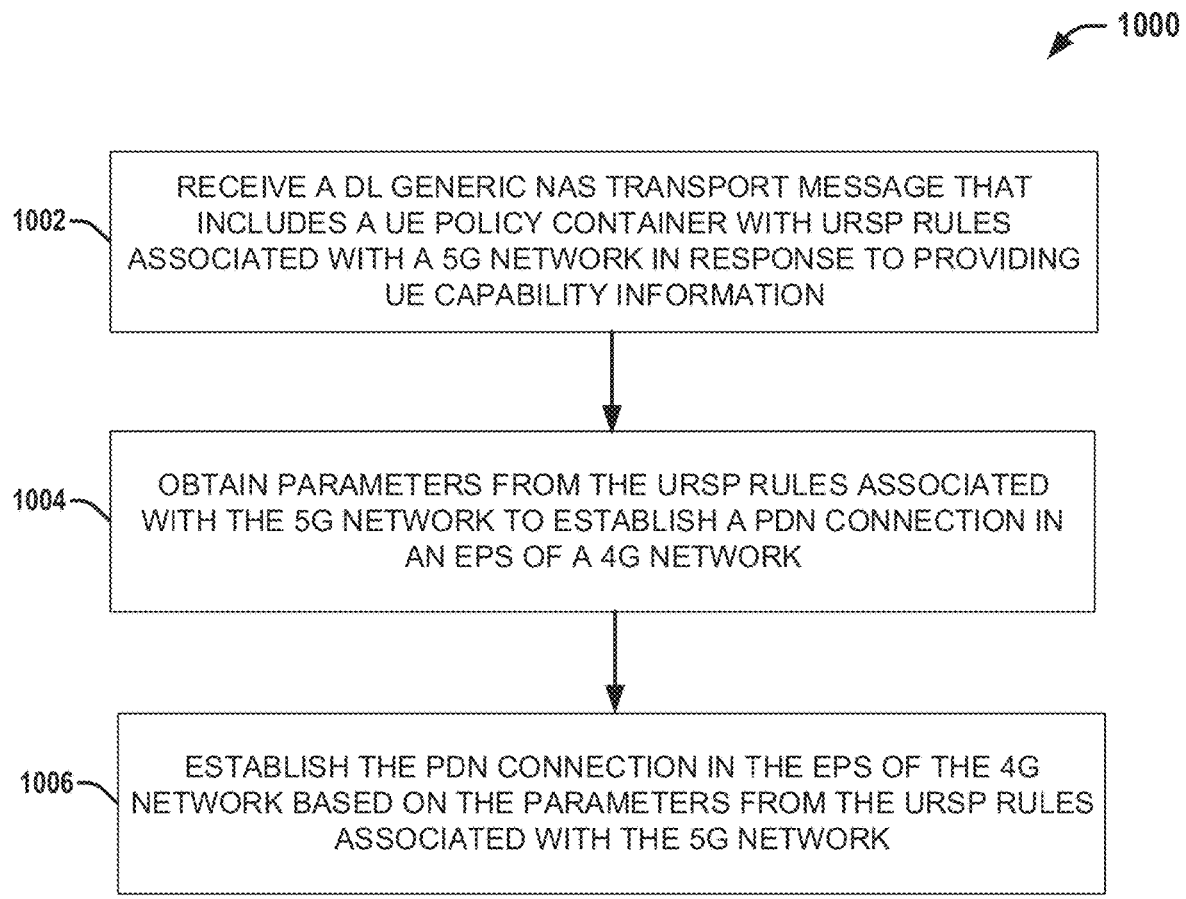
FIG. 10 is a block diagram illustrating an example process flow for provisioning URSP rules according to various aspects described herein.

Referring to FIG. 10, illustrated is an example process flow 1000 for a network device (e.g., a user equipment (UE), a new radio NB (gNB), 5GC component/network device or the like) or a service producer/service consumer that can process, generate, or monitor new radio (NR) communication via a 5GC 120 to perform provisioning of URSP rules for an EPS of a 4GC 140.

At 1002, the process flow 1000 includes receiving a DL GENERIC NAS TRANSPORT message that includes a UE policy container with URSP rules associated with a 5G network in response to providing UE capability information.

At 1004, the process flow 1000 includes obtaining parameters from the URSP rules associated with the 5G network to establish a PDN connection in an EPS of a 4G network.

At 1006, process flow 1000 includes establishing the PDN connection in the EPS of the 4G network based on the parameters from the URSP rules associated with the 5G network.

Figure 11:
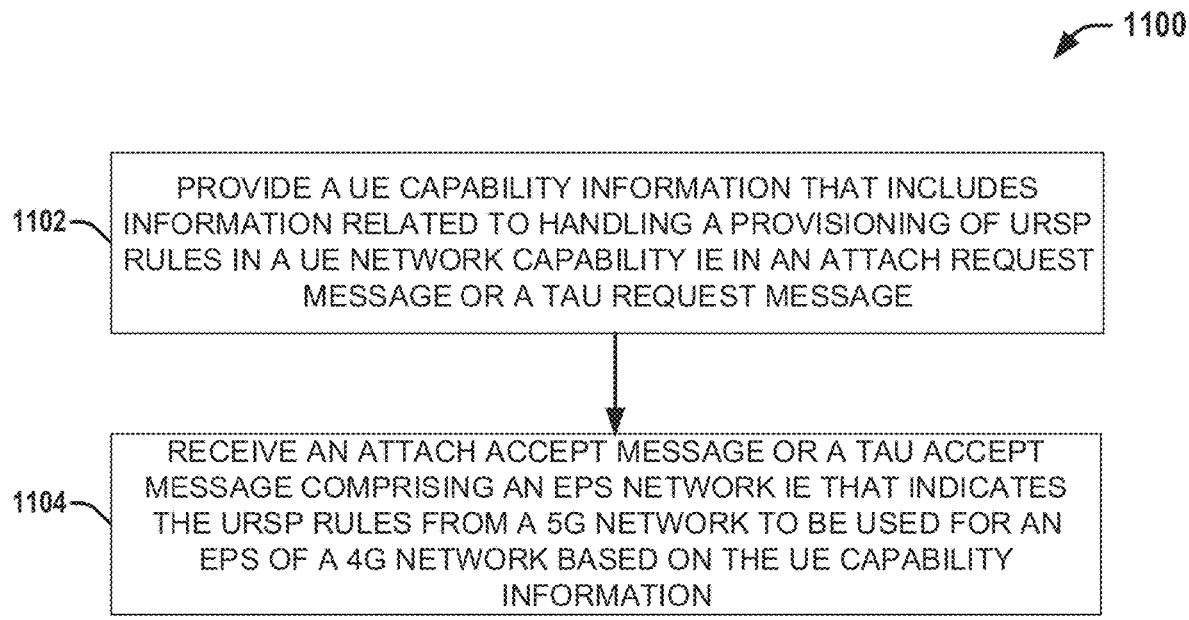
FIG. 11 is a block diagram illustrating an example process flow for provisioning URSP rules according to various aspects described herein.

Referring to FIG. 11, illustrated is an example process flow 1100 for a network device (e.g., a user equipment (UE), a new radio NB (gNB), 5GC component/network device or the like) or a service producer/service consumer that can process, generate, or monitor new radio (NR) communication via a 5GC 120 to perform provisioning of URSP rules for an EPS of a 4GC 140.

At 1102, the process flow 1100 includes providing a UE capability information that includes information related to handling a provisioning of URSP rules in a UE network capability IE in an ATTACH REQUEST message or a TAU REQUEST message.

At 1104, the process flow 1100 includes receiving an ATTACH ACCEPT message or a TAU ACCEPT message comprising an EPS network IE that indicates the URSP rules from a 5G network to be used for EPS of a 4G network based on the UE capability information.

Referring to FIG. 12, illustrated is an example message flow 1200 including a payload container type IE 602 in accord with various aspects for provisioning URSP rules in EPC. As described above, the 5G system of the 5G core network 120 and the EPS of 4G core network 140 can share a common/combined PCF 126+PCRF 226. To support interworking IWK with EPC, a common/combined SMF 124+PGW 223 control plane (PGW-C) can provide information over the interface N4 to UPF 102+PGW 223 user plane (PGW-U) related to the handling of traffic over an S5 user plane used to handle the traffic. ANDSF rules are provisioned using an IP based interface.

In an aspect, URSP rules can be provisioned in EPS from the 5GC network 120 by the UE 101 configuring and indicating its capability (e.g., a UE capability information) to handle the provisioning of URSP rules in an Attach Request message 1202 as a part of an enhanced Protocol Configuration Options (ePCO). ePCO can be included in a default PDN Connectivity Request message included as part of the Attach Request message 1202 or a first PDN Connectivity Request message 1210 that the UE may send in standalone when establishing the first PDN connection in EPS.

The PCRF 226 can decide to update a UE policy based on one or more trigger conditions such as when the PCF 126/PCRF 226 determines that the UE policy needs to be updated, and provisioned. The PCRF 226 with the network 120 can determine the UE capability and whether the UE supports URSP in EPC in response to an indication of network support for supporting and provisioning of URSP rules. An exchange of the URSP rules can occur between the network 120 and PCRF 226 at messages 1204 and 1206, or 1212 and 1214. The network 120 can retrieve or provide the URSP rules based on a message and response between the network 120 and PCRF 226.

The network 120 responds to the Attach Request 1202 with the Attach Accept message that encapsulates an Activate Default EPS Bearer Context Request message 1208 that includes URSP rules as part of an ePCO. Activate Default EPS Bearer Context Request message can be included in the Attach Accept message 1208 or can be sent standalone if the UE 101 has sent a separate standalone first time PDN Connectivity Request message.

PCRF updates the URSP rules in the UE 101 in EPS using a similar mechanism as in 5GS by encapsulating the generic message container IEs in ePCO during PDN connection establishment 1210. In this case, the network 120 can send the Activate Default Bearer Context Request message 1216 as part of the Attach Accept message to UE 101, which includes the ePCO. If the UE 101 has sent a separate standalone first time PDN Connectivity Request message, then the network just responds with a standalone Activate Default Bearer Context Request message 1216 to update URSP rules by including them in ePCO.

In an aspect, the UE can thus transmit an ATTACH REQUEST message 1202 or a first PDN connectivity request message 1210 that includes a UE capability information as a part of an enhanced Protocol Configuration Options (ePCO) to provision an update of the URSP rules of the 5G network when the UE is connected in the 4G network. Then in response to providing the ATTACH REQUEST message or the first PDN connectivity request message, the UE can receive an ATTACH ACCEPT message 1210 that includes the Activate Default Bearer Context Request message or a standalone Activate Default Bearer Context Request message 1216 which includes URSP rules in the ePCO to update the URSP rules from the 5G network when the UE is connected to the 4G network.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit) ASIC (an electronic circuit, a processor (shared, dedicated, or group (or associated memory) shared, dedicated, or group (operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an User Equipment (UE) comprising: a memory; processing circuitry, coupled to the memory, configured to: receive a downlink (DL) generic non-access stratum (NAS) transport (DL GENERIC NAS TRANSPORT) message that includes a UE policy container with UE route selection policy (URSP) rules associated with a 5G network; obtain parameters from the URSP rules associated with the 5G network to establish a packet data network (PDN) connection in an evolved packet system (EPS) of a 4G network; and establishing the PDN connection in the EPS of the 4G network based on the parameters from the URSP rules associated with the 5G network.

A second example can include the first example, wherein the processing circuitry is further configured to: provide an acknowledgement (ACK) in an uplink (UL) generic NAS transport (UL GENERIC NAS TRANSPORT) message in response to receiving the DL GENERIC NAS TRANSPORT message.

A third example can include the first or second example, wherein the processing circuitry is further configured to: transmit an ATTACH REQUEST message or a TRACKING AREA UPDATE (TAU) REQUEST message that includes a UE network capability information element (IE) with a UE capability information to provision an update of the URSP rules of the 5G network in the EPS of the 4G network; and in response to transmitting the ATTACH REQUEST message or the TAU REQUEST message, receive an ATTACH ACCEPT message or a TAU ACCEPT message comprising an EPS network feature support IE that indicates a network capability to update of the URSP rules from the 5G network for the 4G network.

A fourth example can include any one or more of the first through third examples, wherein the ATTACH ACCEPT message or the TAU ACCEPT message comprises a generic message container type IE and a generic message container IE.

A fifth example can include any one or more of the first through fourth examples, wherein the DL GENERIC NAS TRANSPORT message comprises a generic message container IE that indicates a presence of UE policy container of the 5G network for the EPS of the 4G network based on a bit value.

A sixth example can include any one or more of the first through fifth examples, wherein the URSP rules that are associated with a Policy Control Function (PCF) only are applied in the EPS of the 4G network and comprise a higher priority and precedence than any preconfigured rules in a Mobile Equipment (ME) or a Universal Subscriber Identity Module (USIM), and wherein other preconfigured rules in both the USIM and the ME are applied from the USIM.

A seventh example can include any one or more of the first through sixth examples, wherein the URSP rules for the EPS of the 4G network comprise a higher priority and precedence than at least one of: preconfigured rules or access network discovery and selection function (ANDSF) rules.

An eighth example can include any one or more of the first through seventh examples, wherein the processing circuitry is further configured to: provision the parameters of the URSP rules from the 5G network in the EPS of the 4G network that are associated with the EPS of the 4G network for establishing the PDN connection, wherein the parameters of the URSP rules are associated with the EPS of the 4G network based on one or more of: an application associated with the PDN connection, a non-seamless non-3GPP offload indication, a Data Network Name (DNN) to derive an Access Point Name (APN), an access type preference, a Session and Service Continuity (SSC) mode, location information, or traffic category parameters for specific applications.

A ninth example can include any one or more of the first through eighth examples, wherein the processing circuitry is further configured to: transmit an ATTACH REQUEST message or a first PDN connectivity request message that includes a UE capability information as a part of an enhanced Protocol Configuration Options (ePCO) to provision an update of the URSP rules of the 5G network in the 4G network; and in response to providing the ATTACH REQUEST message or the first PDN connectivity request message, receive an ATTACH ACCEPT message that includes the Activate Default Bearer Context Request message or a standalone Activate Default Bearer Context Request message which includes URSP rules in the ePCO to update the URSP rules from the 5G network when the UE is connected to the 4G network.

A tenth example can be a baseband processor comprising: processing circuitry, coupled to a memory, configured to: receive a downlink (DL) generic non-access stratum (NAS) transport (DL GENERIC NAS TRANSPORT) message that includes a UE policy container comprising updated URSP rules to obtain policy components for use in a 4G network; and transmit an acknowledgment of the DL GENERIC NAS TRANSPORT message.

An eleventh example can include the tenth example, wherein the processing circuitry is further configured to: transmit a UE capability information that includes information related to handling a provisioning of UE Route Selection Policy (URSP) rules in a UE Network Capability Information Element (IE) in an ATTACH REQUEST message or a TRACKING AREA UPDATE (TAU) REQUEST message; and receive an ATTACH ACCEPT message or a TAU ACCEPT message comprising an EPS network IE that indicates the URSP rules from a 5G network to be used for evolved packet system (EPS) of the 4G network based on the UE capability information, wherein the acknowledgment of the DL GENERIC NAS TRANSPORT message is transmitted via an uplink (UL) generic NAS transport (UL GENERIC NAS TRANSPORT) message.

An twelfth example can include any one or more of the tenth through eleventh examples, wherein the DL GENERIC NAS TRANSPORT message comprises a generic message container type IE that includes the UE policy container of the 5G network for the EPS of the 4G network associated with a bit value, wherein the bit value of the UE policy container indicates a presence of UE policy type information for establishing a packet data network (PDN) connection in the EPS of the 4G network.

A thirteenth example can include any one or more of the tenth through the thirteenth examples, wherein the processing circuitry is further configured to: provision the URSP rules from a Policy Control Function (PCF) in the EPS of the 4G network, wherein the URSP rules from the PCF comprise a higher priority and precedence than preconfigured rules from a Mobile Equipment (ME) or a Universal Subscriber Identity Module (USIM), and wherein other preconfigured rules from both the USIM and the ME are applied from the USIM.

A fourteenth example can include any one or more of the tenth through the thirteenth examples, wherein the processing circuitry is further configured to: provision parameters of the URSP rules from the 5G network in the EPS of the 4G network to establish packet data network (PDN) connection by obtaining the parameters that are associated with one or more of: the PDN connection, a non-seamless non-3GPP offload indication, a Data Network Name (DNN) to derive an Access Point Name (APN), an access type preference, a Session and Service Continuity (SSC) mode, a location information, or traffic category parameters for specific applications.

A fifteenth example can include any one or more of the tenth through the fourteenth examples, wherein the processing circuitry is further configured to: receive another ATTACH ACCEPT message or another TAU ACCEPT message comprising another EPS network feature support IE that indicates one or more updated URSP rules from the 5G network to establish a PDN connection in the 4G network in response to a UE mobility or a change in mobility parameters of the URSP rules that are associated with both the EPS of the 4G network and the 5G network, wherein the updated URSP rules replace one or more of the URSP rules already provisioned in roaming operations or non-roaming operations.

A sixteenth example can include any one or more of the tenth through the fifteenth examples, wherein the URSP rules for the EPS of the 4G network comprise a higher priority and precedence than one or more of: preconfigured rules or access network discovery and selection function (ANDSF) rules.

A seventeenth example can be a mobility management entity (MME) comprising: a memory; processing circuitry, coupled to the memory, configured to: generate a downlink (DL) generic non-access stratum (NAS) transport (DL GENERIC NAS TRANSPORT) message with a UE policy container that indicates UE route selection policy (URSP) rules associated with a 5G network for provisioning the URSP rules in an evolved packet system (EPS) of a 4G network in response to receiving UE capability information, UE mobility, or a change in one or more mobility parameters of the URSP rules associated with the EPS of the 4G network; and transmit the DL GENERIC NAS TRANSPORT message with a generic message container IE that includes the UE policy container to enable the URSP rules from the 5G network to be provisioned in the EPS of the 4G network.

An eighteenth example can include the seventeenth example, wherein the processing circuitry is further configured to: receive an acknowledgement (ACK) in an UL GENERIC NAS TRANSPORT in response to providing the DL GENERIC NAS TRANSPORT message.

A nineteenth example can include any one or more of the seventeenth through eighteenth examples, wherein the processing circuitry is further configured to: provide an ATTACH ACCEPT message or a TRACKING AREA UPDATE ACCEPT message that comprises an EPS network feature support IE indicating network capability to support provisioning an updated URSP policy in response to receiving a UE network capability IE. A twentieth example can include any one or more of the seventeenth through nineteenth examples, wherein the ATTACH ACCEPT message or the TAU ACCEPT message comprises a generic message payload container type and a generic message payload container IE.

A twenty-first example can include any one or more of the seventeenth through twentieth examples, wherein the processing circuitry is further configured to: select parameters of the URSP rules from the 5G network in the EPS of the 4G network to enable a packet data network (PDN) connection in the EPS of the 4G network by selecting the parameters associated with both the EPS of the 4G network and the 5G network, and not selecting parameters with the 5G network alone.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) comprising:
a memory;
processing circuitry, coupled to the memory, configured to, when executing instructions stored in the memory, cause the UE to:
receive a downlink (DL) generic non-access stratum (NAS) transport (DL GENERIC NAS TRANSPORT) message that includes a UE policy container with UE route selection policy (URSP) rules associated with a 5G network, wherein the URSP rules include at least one 5G-related URSP rule that is non-applicable to operation in an evolved packet system (EPS) of a 4G network and at least one EPS-related URSP rule that is applicable to operation in an EPS of a 4G network;
provision the at least one EPS-related URSP rule and refrain from provisioning the at least one 5G-related URSP rule;
obtain a parameter from the at least one EPS-related URSP rule to establish a packet data network (PDN) connection in an evolved packet system (EPS) of a 4G network; and
establish the PDN connection in the EPS of the 4G network based on the parameter from the at least one EPS-related URSP rule.

2. The UE of claim 1, wherein the processing circuitry is further configured to:
provide an acknowledgement (ACK) in an uplink (UL) generic NAS transport (UL GENERIC NAS TRANSPORT) message in response to receiving the DL GENERIC NAS TRANSPORT message.

3. The UE of claim 1, wherein the processing circuitry is further configured to:
transmit an ATTACH REQUEST message or a TRACKING AREA UPDATE (TAU) REQUEST message that includes a UE network capability information element (IE) with a UE capability information to provision an update of the URSP rules of the 5G network in the EPS of the 4G network; and
in response to transmitting the ATTACH REQUEST message or the TAU REQUEST message, receive an ATTACH ACCEPT message or a TAU ACCEPT message comprising an EPS network feature support IE that indicates a network capability to update of the URSP rules from the 5G network for the 4G network.

4. The UE of claim 3, wherein the ATTACH ACCEPT message or the TAU ACCEPT message comprises a Generic message container type IE and a Generic message container IE.

5. The UE of claim 1, wherein the DL GENERIC NAS TRANSPORT message comprises a generic message container IE that indicates a presence of UE policy container of the 5G network for the EPS of the 4G network based on a bit value.

6. The UE of claim 1, wherein the processing circuitry is configured to cause the UE to apply the at least one EPS-related URSP rule when establishing the PDN connection and refrain from applying a preconfigured rule in a Mobile Equipment (ME) or a Universal Subscriber Identity Module (USIM) associated with the UE.

7. The UE of claim 1, wherein the at least one 5G-related URSP rule comprises a parameter including multi-access preferences, 5G ProSe layer 3, or UE to network relay offload.

8. The UE of claim 1, wherein the parameter of the at least one EPS-related URSP rule is associated with the EPS of the 4G network based on one or more of: an application associated with the PDN connection, a non-seamless non-3GPP offload indication, a Data Network Name (DNN) to derive an Access Point Name (APN), an access type preference, a Session and Service Continuity (SSC) mode, location information, or a traffic category parameter for a specific application.

9. The UE of claim 1, wherein the processing circuitry is further configured to:
transmit an ATTACH REQUEST message or a first PDN connectivity request message that includes a UE capability information as a part of an enhanced Protocol Configuration Options (ePCO) to provision an update of the URSP rules of the 5G network in the 4G network; and
in response to providing the ATTACH REQUEST message or the first PDN connectivity request message, receive an ATTACH ACCEPT message that includes an Activate Default Bearer Context Request message or a standalone Activate Default Bearer Context Request message which includes URSP rules in the ePCO to update the URSP rules from the 5G network when the UE is connected to the 4G network.

10. A baseband processor comprising:
processing circuitry, coupled to a memory, configured to:
receive a downlink (DL) generic non-access stratum (NAS) transport (DL GENERIC NAS TRANSPORT) message that includes a UE policy container comprising updated URSP rules to obtain policy components for use in a 4G network, wherein the URSP rules include at least one 5G-related URSP rule that is non-applicable to operation in an evolved packet system (EPS) of a 4G network and at least one EPS-related URSP rule that is applicable to operation in an EPS of a 4G network;
transmit an acknowledgment of the DL GENERIC NAS TRANSPORT message;
provision the at least one EPS-related URSP rule and refrain from provisioning the at least one 5G-related URSP rule;
obtain a parameter from the at least one EPS-related URSP rule to establish a packet data network (PDN) connection in an evolved packet system (EPS) of a 4G network; and
establish the PDN connection in the EPS of the 4G network based on the parameter from the at least one EPS-related URSP rule.

11. The baseband processor of claim 10, wherein the processing circuitry is further configured to:
transmit a UE capability information that includes information related to handling a provisioning of UE Route Selection Policy (URSP) rules in a UE Network Capability Information Element (IE) in an ATTACH REQUEST message or a TRACKING AREA UPDATE (TAU) REQUEST message; and
receive an ATTACH ACCEPT message or a TAU ACCEPT message comprising an EPS network IE that indicates the URSP rules from a 5G network to be used for evolved packet system (EPS) of the 4G network based on the UE capability information, wherein the acknowledgment of the DL GENERIC NAS TRANSPORT message is transmitted via an uplink (UL) generic NAS transport (UL GENERIC NAS TRANSPORT) message.

12. The baseband processor of claim 11, wherein the DL GENERIC NAS TRANSPORT message comprises a generic message container type IE that includes the UE policy container of the 5G network for the EPS of the 4G network associated with a bit value, wherein the bit value of the UE policy container indicates a presence of UE policy type information for establishing a packet data network (PDN) connection in the EPS of the 4G network.

13. The baseband processor of claim 11, wherein the processing circuitry is further configured to:
to apply the at least one EPS-related URSP rule when establishing the PDN connection and refrain from applying a preconfigured rule from a Mobile Equipment (ME) or a Universal Subscriber Identity Module (USIM).

14. The baseband processor of claim 11, wherein the parameter of the at least one EPS-related URSP rule is associated with one or more of: the PDN connection, a non-seamless non-3GPP offload indication, a Data Network Name (DNN) to derive an Access Point Name (APN), an access type preference, a Session and Service Continuity (SSC) mode, a location information, or a traffic category parameter for a specific application.

15. The baseband processor of claim 11, wherein the processing circuitry is further configured to:
receive another ATTACH ACCEPT message or another TAU ACCEPT message comprising another EPS network feature support IE that indicates one or more updated URSP rules from the 5G network to establish a PDN connection in the 4G network in response to a UE mobility or a change in a mobility parameter of the URSP rules that are associated with both the EPS of the 4G network and the 5G network, wherein the updated URSP rules replace one or more of the URSP rules already provisioned in roaming operations or non-roaming operations.

16. The baseband processor of claim 11, wherein the at least one 5G-related URSP rule comprises a parameter including multi-access preferences, 5G ProSe layer 3, or UE to network relay offload.

17. A mobility management entity (MME) comprising:
a memory;
processing circuitry, coupled to the memory, configured to:
generate a downlink (DL) generic non-access stratum (NAS) transport (DL GENERIC NAS TRANSPORT) message with a UE policy container that indicates UE route selection policy (URSP) rules associated with a 5G network for provisioning the URSP rules in an evolved packet system (EPS) of a 4G network in response to receiving UE capability information, UE mobility, or a change in one or more mobility parameters of the URSP rules associated with the EPS of the 4G network, wherein the URSP rules include at least one 5G-related URSP rule that is non-applicable to operation in an evolved packet system (EPS) of a 4G network and at least one EPS-related URSP rule that is applicable to operation in an EPS of a 4G network; and
transmit the DL GENERIC NAS TRANSPORT message with a generic message container IE that includes the UE policy container to enable the URSP rules from the 5G network to be provisioned in the EPS of the 4G network.

18. The MME of claim 17, wherein the processing circuitry is further configured to:
receive an acknowledgement (ACK) in an UL GENERIC NAS TRANSPORT in response to providing the DL GENERIC NAS TRANSPORT message.

19. The MME of claim 17, wherein the processing circuitry is further configured to:
provide an ATTACH ACCEPT message or a TRACKING AREA UPDATE ACCEPT message that comprises an EPS network feature support IE indicating network capability to support provisioning an updated URSP policy in response to receiving a UE network capability IE.

20. The MME of claim 19, wherein the ATTACH ACCEPT message or the TAU ACCEPT message comprises a generic message payload container type and a generic message payload container IE.

* * * * *